United States Patent
Byrne et al.

(10) Patent No.: US 10,415,250 B2
(45) Date of Patent: *Sep. 17, 2019

(54) LIQUID-APPLIED WATERPROOFING MEMBRANE COMPRISING OXAZOLIDINE AND ALDIMINE

(71) Applicant: Sika Technology AG, Baar (CH)

(72) Inventors: Michael Byrne, Lytham (GB); Mark Gatrell, Chipping Preston (GB); Alexander Coward, Sale (GB); Urs Burckhardt, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 402 days.

This patent is subject to a terminal disclaimer.

(21) Appl. No.: 14/760,856

(22) PCT Filed: Jan. 21, 2014

(86) PCT No.: PCT/EP2014/051135
§ 371 (c)(1),
(2) Date: Jul. 14, 2015

(87) PCT Pub. No.: WO2014/114640
PCT Pub. Date: Jul. 31, 2014

(65) Prior Publication Data
US 2016/0024318 A1  Jan. 28, 2016

(30) Foreign Application Priority Data
Jan. 22, 2013 (EP) .................................. 13152262

(51) Int. Cl.
| | | |
|---|---|---|
| *E04D 7/00* | (2006.01) |
| *C09D 175/04* | (2006.01) |
| *B05D 1/40* | (2006.01) |
| *B32B 5/02* | (2006.01) |
| *E04D 11/02* | (2006.01) |
| *C09D 7/20* | (2018.01) |
| *C08G 18/50* | (2006.01) |
| *C08G 18/10* | (2006.01) |
| *C08G 18/30* | (2006.01) |
| *C08G 18/32* | (2006.01) |

(52) U.S. Cl.
CPC ................ *E04D 7/00* (2013.01); *B05D 1/40* (2013.01); *B32B 5/028* (2013.01); *C08G 18/10* (2013.01); *C08G 18/307* (2013.01); *C08G 18/3256* (2013.01); *C08G 18/503* (2013.01); *C09D 7/20* (2018.01); *C09D 175/04* (2013.01); *E04D 11/02* (2013.01); *B32B 2260/046* (2013.01); *B32B 2307/7265* (2013.01); *B32B 2419/06* (2013.01)

(58) Field of Classification Search
CPC ................ B05D 1/40; B32B 2260/046; B32B 2307/7265; B32B 2419/06; B32B 5/028; C08G 18/10; C08G 18/307; C08G 18/503; C08G 18/3256; C08G 18/3844; C09D 175/04; C09D 7/001; E04D 11/02; E04D 7/00

See application file for complete search history.

(56) References Cited

U.S. PATENT DOCUMENTS

| 3,900,687 | A | * | 8/1975 | Meader, Jr. ........... C04B 41/009 404/32 |
| 5,189,176 | A | * | 2/1993 | Blum ................... C07D 263/04 525/375 |
| 5,466,769 | A | | 11/1995 | Chou |
| 5,506,329 | A | | 4/1996 | Chou |
| 5,571,922 | A | | 11/1996 | Chou |
| 5,591,819 | A | | 1/1997 | Chou |
| 7,629,433 | B2 | | 12/2009 | Burckhardt |
| 8,178,167 | B2 | | 5/2012 | Walther et al. |
| 8,759,455 | B2 | * | 6/2014 | Zahn ..................... C08G 18/10 156/331.7 |
| 2003/0220407 | A1 | * | 11/2003 | Chaignon .......... C08G 18/0885 521/50 |
| 2009/0099333 | A1 | * | 4/2009 | Burckhardt ........... C07C 251/08 528/310 |

(Continued)

FOREIGN PATENT DOCUMENTS

| CN | 101309898 A | 11/2008 |
| CN | 101312942 A | 11/2008 |

(Continued)

OTHER PUBLICATIONS

Office Action/Search Report dated Mar. 20, 2017, by the Chinese Patent Office in corresponding Chinese Patent Application No. 201480004120.7 and English translation of the Office Action/Search Report. (21 pages).
International Search Report (PCT/ISA/210) dated Feb. 25, 2014, by the European Patent Office as the International Searching Authority for International Application No. PCT/EP2014/051135.
Written Opinion (PCT/ISA/237) dated Feb. 25, 2014, by the European Patent Office as the International Searching Authority for International Application No. PCT/EP2014/051135.
International Search Report (PCT/ISA/210) dated Mar. 6, 2014, by the European Patent Office as the International Searching Authority for International Application No. PCT/EP2014/051137.

(Continued)

Primary Examiner — Satya B Sastri
(74) Attorney, Agent, or Firm — Oliff PLC

(57) ABSTRACT

The present invention describes a one-part moisture-curing liquid-applied waterproofing membrane including a polyurethane polymer and both an aldimine and an oxazolidine as blocked amine hardeners in a specific ratio range. The membrane has a low odor, a long shelf life stability, a low viscosity at low solvent content, a sufficiently long open time to allow hand application and cures fast to a solid elastic material. The liquid-applied waterproofing membrane can be suitable for roofing applications, possessing high strength, high elongation and good durability under outdoor weathering conditions in a broad temperature range.

18 Claims, No Drawings

(56) References Cited

U.S. PATENT DOCUMENTS

| | | |
|---|---|---|
| 2009/0176944 A1 | 7/2009 | Burckhardt |
| 2010/0009076 A1 | 1/2010 | Walther et al. |
| 2010/0101455 A1 | 4/2010 | Burckhardt |
| 2012/0045652 A1 | 2/2012 | Zahn et al. |
| 2012/0220736 A1 | 8/2012 | Burckhardt |

FOREIGN PATENT DOCUMENTS

| | | |
|---|---|---|
| CN | 101484491 | 7/2009 |
| EP | 2 017 260 A1 | 1/2009 |
| EP | 2 236 534 A1 | 10/2010 |
| JP | 9-286836 A | 11/1997 |
| JP | 2007-332257 A | 12/2007 |
| JP | 2009-541563 A | 11/2009 |
| WO | WO 95/11933 A1 | 5/1995 |
| WO | WO 2008/000831 A1 | 1/2008 |
| WO | WO 2009/010522 A1 | 1/2009 |
| WO | WO 2010112537 A1 * | 10/2010 ............. C08G 18/10 |

OTHER PUBLICATIONS

Written Opinion (PCT/ISA/237) dated Mar. 6, 2014, by the European Patent Office as the International Searching Authority for International Application No. PCT/EP2014/051137.
Nov. 12, 2018 Office Action issued in European Patent Application No. 14701064.9.
Jun. 12, 2018 Office Action issued in Chinese Patent Application No. 201480004120.7.
Dec. 11, 2017 Office Action issued in Chinese Patent Application No. 201480004120.7.
Jan. 9, 2018 Office Action issued in Japanese Patent Application No. 2015-553123.

\* cited by examiner

LIQUID-APPLIED WATERPROOFING MEMBRANE COMPRISING OXAZOLIDINE AND ALDIMINE

FIELD OF THE INVENTION

The invention relates to a liquid-applied waterproofing membrane based on one-part moisture-curing polyurethane, particularly for roofing applications.

BACKGROUND OF THE INVENTION

Liquid-applied waterproofing membranes are known. In roofing applications they are used as an alternative to prefabricated sheet membranes, offering easier application especially in the case of complex roof geometries and for refurbishment tasks, providing a flexible seamless roof coating which is fully adhered to the substrate.

Liquid-applied waterproofing membranes on roofs have to fulfill demanding requirements. They need to have a low viscosity to be applied as self-levelling coatings and a sufficiently long open time to enable hand application, but still cure fast in order to quickly lose their vulnerability. When fully cured the roofing membrane needs to have durable elasticity and strength in order to protect the building effectively from water ingress in a broad temperature range and under outdoor weathering conditions, such as wind forces, ponding water, frost, strong sunlight irradiation, microbial attack and root penetration.

State-of-the-art liquid-applied waterproofing membranes are often reactive polyurethane compositions, formulated as one-part or as two-part systems, also called single-component or two-component systems, respectively. Two-part systems are more complex to apply, requiring special mixing equipment and proper metering of the two components, since mistakes in mixing quality and/or stoichiometry strongly affect the membrane performance. One-part systems are easy to apply, but prone to curing defects. State-of-the-art one-part systems comprise blocked amine hardeners, in particular oxazolidines, to prevent excessive gassing from carbon dioxide formation on curing. They generally contain considerable amounts of solvents to guarantee low viscosity and sufficient shelf life. Attempts spurred by tightening VOC regulation to reduce the solvent content of such one-part systems typically result in difficulties with shelf life stability and bad workability because of high viscosity, as the viscosity of the compositions starts on a higher level and increases further from premature crosslinking reactions between the NCO groups of the prepolymer and the oxazolidine hardeners during storage. Further drawbacks of oxazolidine-based one-part membranes are related to slow curing and unpleasant odours caused by the emission of the blocking agent, a volatile aldehyde or ketone.

WO 2008/000831 discloses low VOC coating compositions, preferably for flooring purposes, which are based on aldol ester polyaldimines as blocked amine hardeners. While these compositions have good shelf life stability and cure without generating unpleasant odours, they are limited in strength development due to the low functionality hardener and the plasticizing effect of the aldol ester blocking agent. The coatings of the examples are either too stiff for roofing applications or contain high amounts of solvent.

SUMMARY OF THE INVENTION

The task of this invention is to provide a one-part liquid-applied waterproofing membrane useful for roofing applications having good shelf life stability and good workability at low solvent content, even when only about 50 g VOC per liter or less, as well as fast and reliable curing properties.

Surprisingly it was found that the liquid-applied waterproofing membrane according to Claim 1 fulfills this task and has additional benefits. It comprises an isocyanate-functional polyurethane polymer providing good tensile strength and high elongation almost independent of temperature, remaining elastic also under cold climate conditions. It further comprises an aldol ester aldimine in a specific ratio range with an oxazolidine. This specific combination surprisingly affords a very attractive set of properties not reached by state-of-the-art membranes based on aldimines or oxazolidines alone: good shelf life stability and a low viscosity even at low solvent content, good mechanical properties, in particular high tensile strength in conjunction with high elongation, long open time allowing hand application yet fast and reliable curing properties preventing defects. The combination of an aldimine and an oxazolidine as two separate molecules instead of using one molecule carrying both aldimino and oxazolidino groups offers the advantage that the aldimine and the oxazolidine are derived from different types of aldehydes, as oxazolidines derived from aldol ester aldehydes are not hydrolysing fast enough and aldimines derived from alkylaldehydes increase smell and aldehyde emission of the membrane.

The possibility of combining low solvent content with long shelf life provides the formulator with the unique opportunity to obtain a high-end product fulfilling toughest VOC regulations, having minimal shrinkage and a very low odour profile. The fast curing properties in conjunction with a long open time allow careful application and provide high early strength, thus minimizing the time in which the membrane is vulnerable and speeding up application in case of a multi-layer build-up. The good mechanical properties afford high crack-bridging qualities in a broad temperature range and ensure high durability.

Another aspect of the invention is the use of an aldol ester aldimine as a non-VOC diluent for oxazolidine-based one-part moisture-curing liquid-applied waterproofing membranes, providing additional benefits, such as good shelf life stability of the uncured material, faster curing, less odour and high strength and elongation of the cured membrane.

The liquid-applied membrane according to Claim 1 is particularly suitable for use on a roof, particularly on a flat or low slope roof. It is particularly advantageous for detailing work and for refurbishment purposes.

Other aspects of the invention are revealed in other independent claims. Preferred aspects of the invention are revealed in the dependent claims.

DETAILED DESCRIPTION OF THE INVENTION

The subject of the present invention is a one-part moisture-curing liquid-applied waterproofing membrane comprising
at least one isocyanate-functional polyurethane polymer;
at least one aldimine of the formula (I),

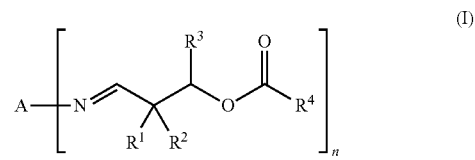

wherein
A is an n-valent hydrocarbyl moiety of molecular weight in the range of 28 to 5000 g/mol optionally containing ether or urethane groups,
$R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
$R^3$ is hydrogen or a linear or branched $C_1$ to $C_{12}$ alkyl or arylalkyl or alkoxycarbonyl,
$R^4$ is a monovalent $C_6$ to $C_{20}$ hydrocarbyl moiety optionally containing ether, carbonyl or ester groups, and
n is from 2 to 6;
at least one oxazolidine of the formula (II),

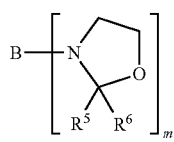

wherein
B is a m-valent hydrocarbyl moiety of molecular weight in the range of 28 to 2000 g/mol optionally containing ether, ester, amide, carbonate, urethane or urea groups,
$R^5$ and $R^6$ are independently selected from hydrogen or $C_1$ to $C_{12}$ linear or branched alkyl, and
m is 2 or 3;
whereby the ratio between the number of aldimino groups and the number of oxazolidino groups is in the range of 80/20 to 20/80.

In this document, the term "one-part moisture-curing" refers to a liquid-applied membrane, which is contained in a single moisture-tight container, has a certain shelf life stability and cures when exposed to moisture.

In this document the term "liquid-applied waterproofing membrane" refers to a material which is applied in liquid form as a layer onto a substrate, and which cures to form an elastic membrane making the substrate waterproof.

In this document, the term "polyurethane polymer" includes all polymers prepared by the so-called diisocyanate polyaddition process. It includes isocyanate-functional polyurethane polymers obtained by reacting polyisocyanates and polyols, which may also be called prepolymers and are polyisocyanates themselves.

In this document, the term "shelf life stability" refers to the ability of a composition to be stored at room temperature in a suitable container under exclusion of moisture for a certain time interval, in particular several months, without undergoing significant changes in application or end-use properties.

In this document, substance names starting with "poly", such as polyol, polyisocyanate or polyamine, refer to substances carrying two or more of the respective functional groups (e.g. OH groups in the case of polyol) per molecule.

In this document an amine or an isocyanate is called "aliphatic" when its amino group or its isocyanate group, respectively, is directly bound to an aliphatic, cycloaliphatic or arylaliphatic moiety. The corresponding functional group is therefore called an aliphatic amino or an aliphatic isocyanate group, respectively.

In this document an amine or an isocyanate is called "aromatic" when its amino group or its isocyanate group, respectively, is directly bound to an aromatic moiety. The corresponding functional group is therefore called an aromatic amino or an aromatic isocyanate group, respectively.

In this document, the term "primary amino group" refers to an $NH_2$-group bound to an organic moiety, and the term "secondary amino group" refers to a NH-group bound to two organic moieties which together may be part of a ring.

In this document the acronym "VOC" stands for "volatile organic compounds", which are organic substances having a vapour pressure of at least 0.01 kPa at a temperature of 293.14 K.

In this document, the term "solvent" refers to a liquid which is a VOC, which is able to dissolve isocyanate-functional polyurethane polymers as described in this document, and which does not carry any isocyanate-reactive functional groups.

In this document, "room temperature" refers to a temperature of 23° C.

In this document the term "molecular weight" refers to the molar mass (given in grams per mole) of a molecule or a part of a molecule, also referred to as "moiety". The term "average molecular weight" refers to the number-average molecular weight ($M_n$) of an oligomeric or polymeric mixture of molecules or moieties.

The liquid-applied membrane of this invention comprises at least one isocyanate-functional polyurethane polymer.

A suitable isocyanate-functional polyurethane polymer may be obtained from the reaction of at least one polyisocyanate with at least one polyol, whereby the isocyanate groups are in stoichiometric excess over the hydroxyl groups. The polyisocyanate and the polyol are brought to reaction via known methods, preferably at temperatures between 50 and 100° C., optionally by using a suitable catalyst. Preferably the polyisocyanate is used in an amount corresponding to an isocyanate to hydroxyl group ratio in the range of 1.3 to 5, more preferably 1.5 to 3. Preferably the polyurethane polymer has a free NCO group content in the range of 1 to 10 weight-%, preferably 2 to 8 weight-%. Optionally the polyol and the polyisocyanate may be reacted in the presence of a plasticizer or a solvent which are free from isocyanate-reactive groups.

Preferably the isocyanate-functional polyurethane polymer has an average molecular weight in the range of 1,000 to 10,000 g/mol, more preferably in the range of 1,000 to 5,000 g/mol.

Preferably the isocyanate-functional polyurethane polymer has an average isocyanate functionality in the range of 1.7 to 3, more preferably 1.8 to 2.5.

Suitable polyols for preparing the isocyanate-functional polyurethane polymer are polyether polyols, including those containing dispersed styrene-acrylonitrile (SAN), acrylonitrile-methylmethacrylate or urea particles, further polyester polyols such as products of the polycondensation reaction of diols or triols with lactones or dicarboxylic acids or their esters or anhydrides, further polycarbonate polyols, block copolymer polyols with at least two different blocks of polyether, polyester or polycarbonate units, polyacrylate and polymethacrylate polyols, polyhydroxy-functional fats and oils, especially natural fats and oils, and polyhydrocarbon polyols, such as polyhydroxy-functional polyolefins.

Along with the above-mentioned polyols, small amounts of low molecular weight divalent or multivalent alcohols can be used, such as 1,2-ethanediol, 1,2-propanediol, neopentyl glycol, dibromoneopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols, such as xylitol, sorbitol or mannitol, sugars, such as saccharose, other polyhydric alcohols, low molecular weight alkoxylation products of the above-mentioned divalent or multivalent alcohols, as well as mixtures of the above-mentioned alcohols.

Preferred polyols are diols and triols with an average molecular weight in the range of 500 to 6,000 g/mol, particularly in the range of 1,000 to 5,000 g/mol.

Preferred polyols are polyether polyols, polyester polyols, polycarbonate polyols and polyacrylate polyols.

Particularly preferred polyols are polyether polyols, particularly polyoxyalkylenepolyols. These polyols help to develop good low temperature flexibility in the cured membrane.

Polyoxyalkylenepolyols are products of the polymerziation of ethylene oxide, 1,2-propylene oxide, 1,2- or 2,3-butylene oxide, oxetane, tetrahydrofuran or mixtures thereof, optionally polymerized using a starter molecule with two or more active hydrogen atoms, such as water, ammonia or compounds with several OH- or NH-groups, such as 1,2-ethanediol, 1,2- and 1,3-propanediol, neopentylglycol, diethyleneglycol, triethyleneglycol, the isomeric dipropyleneglycols and tripropyleneglycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds.

Preferred are both polyoxyalkylenepolyols with a low degree of unsaturation (measured according to ASTM D-2849-69 and indicated in milliequivalents of unsaturation per gram of polyol (meq/g)), obtainable, for example, by using so-called double metal cyanide complex catalysts (DMC catalysts), and polyoxyalkylenepolyols with a higher degree of unsaturation, obtainable, for example, by using anionic catalysts such as NaOH, KOH, CsOH or alkali alcoholates. Particularly preferred polyoxyalkylenepolyols are polymerization products of ethylene oxide and/or propylene oxide.

More preferred are polyoxypropylenepolyols and so-called ethylene oxide endcapped polyoxypropylenepolyols. The latter are specific polyoxypropylene-polyoxyethylenepolyols obtainable by post-ethoxylating pure polyoxypropylenepolyols, thus featuring primary hydroxyl groups. These polyols enable good low temperature flexibility and good weathering properties in the cured membrane.

Particularly preferred polyoxyalkylenepolyols are polyoxypropylenediols and -triols and ethylene oxide endcapped polyoxypropylenediols and -triols with an average molecular weight in the range of 500 to 6,000 g/mol, particularly in the range of 1,000 to 4,000 g/mol.

These polyether polyols provide a combination of low viscosity, good weathering properties and good mechanical properties in the cured membrane.

Further particularly preferred polyols are polycarbonate polyols, particularly products of the polycondensation of dialkyl carbonates, diaryl carbonates or phosgene with diols or triols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-octadecanediol, 1,4-cyclohexane dimethanol, dimeric fatty acid diol (dimeryl diol), hydroxypivalic neopentylglycol ester, glycerol and 1,1,1-trimethylolpropane.

Such polycarbonate polyols can help to develop good weathering properties of the membrane.

Preferred low molecular weight alcohols are difunctional alcohols with a molecular weight in the range of 60 to 150 g/mol. Particularly preferred are 1,2-ethanediol, 1,3-propanediol, 1,4-butanediol, 1,5-pentanediol, 1,6-hexanediol, 1,3-cyclohexane dimethanol, 1,4-cyclohexane dimethanol and diethylene glycol. These alcohols improve particularly the strength of the membrane. Most preferred is 1,4-butanediol.

Further preferred low molecular weight alcohols are difunctional bromated alcohols such as dibromoneopentyl glycol. These alcohols improve particularly the flame retarding properties of the membrane.

Preferably the isocyanate-functional polyurethane polymer is prepared from a polyol mixture comprising at least 50 weight-%, more preferably at least 80 weight-%, and most preferably at least 90 weight-%, of polyether polyols.

In a particularly preferred embodiment, the isocyanate-functional polyurethane polymer is obtained from a combination of at least one polyether polyol with a molecular weight in the range of 500 to 6,000 g/mol and at least one diol with a molecular weight in the range of 60 to 150 g/mol, particularly 1,4-butanediol. Such an isocyanate-functional polyurethane polymer shows a low viscosity and provides good mechanical properties, particularly high strength.

Suitable polyisocyanates to obtain the isocyanate-functional polyurethane polymer are the following:

Aliphatic polyisocyanates, particularly 1,4-tetramethylene diisocyanate, 2-methylpentamethylene-1,5-diisocyanate, 1,6-hexanediisocyanate (HDI), 2,2,4- and 2,4,4-trimethyl-1,6-hexanediisocyanate (TMDI), 1,10-decanediisocyanate, 1,12-dodecanediisocyanate, lysine or lysine ester diisocyanate, cyclohexane-1,3- and -1,4-diisocyanate, 1-methyl-2,4- and -2,6-diisocyanatocyclohexane and any mixtures of these isomers (HTDI or $H_6$TDI), 1-isocyanato-3,3,5-trimethyl-5-isocyanatomethyl-cyclohexane (isophoronediisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimer or trimer fatty acid isocyanates, such as 3,6-bis-(9-isocyanatononyl)-4,5-di-(1-heptenyl)cyclohexene (dimeryl diisocyanate), and α,α,α',α',α'',α''-hexamethyl-1,3,5-mesitylene triisocyanate. Preferred thereof are HDI, TMDI, IPDI and $H_{12}$MDI.

Aromatic polyisocyanates, particularly 4,4'-diphenylmethane diisocyanate, 2,4'-diphenylmethane diisocyanate and 2,2'-diphenylmethane diisocyanate and any mixtures of these isomers (MDI), 2,4- and 2,6-toluylene diisocyanate and any mixtures of these isomers (TDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl)thiophosphate. Preferred thereof are MDI and TDI.

Preferred polyisocyanates to obtain the isocyanate-functional polyurethane polymer are aliphatic polyisocyanates. Such polymers provide liquid-applied membranes with a particularly good shelf life stability and light-fastness, i.e. yellowing resistance under sunlight exposure, as well as good UV-resistance. The most preferred aliphatic polyisocyanate to obtain the isocyanate-functional polyurethane polymer is IPDI. Such polymers provide particularly low viscous liquid-applied membranes having high strength and high elongation.

In one embodiment of the invention, preferred polyisocyanates to obtain the isocyanate-functional polyurethane polymer are aromatic polyisocyanates, in particular MDI. MDI is preferred from an EHS point of view since it has a very low volatility. Moreover MDI is inexpensive and affords fast curing and high strength membranes.

To obtain the isocyanate-functional polyurethane polymer, it can be advantageous to use polyisocyanates containing a certain amount of their oligomers or polymers or other derivatives. Especially in the case of MDI, it can be advantageous to use mixtures of MDI with oligomers or polymers or derivatives of MDI, preferably so-called modified MDI containing carbodiimides or uretonimines or urethanes of MDI, which are commercially available e.g. as Desmodur® CD, Desmodur® PF, Desmodur® PC (all from Bayer) or Isonate® M 143 (from Dow), as well as so-called polymeric MDI or PMDI representing mixtures of MDI with homologues of MDI, such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranate® M 10 R (from BASF).

The one-part moisture-curing liquid-applied waterproofing membrane further comprises at least one aldimine of the formula (I).

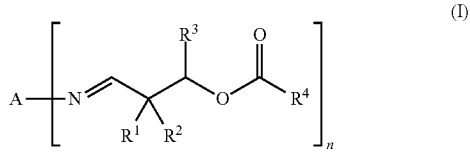

Preferably n is 2 or 3. These aldimines are derived from di- or triamines and enable membranes having good mechanical properties, particularly a good combination of high elongation and high strength.

Preferably $R^1$ and $R^2$ are each methyl. These aldimines enable membranes having low viscosity as well as fast, reliable curing properties.

Preferably $R^3$ is hydrogen. These aldimines provide membranes having low viscosity as well as fast, reliable curing properties.

Preferably $R^4$ is $C_{11}$ alkyl. These aldimines provide odourless membranes having low viscosity and high flexibility at low temperatures.

Particularly preferred are aldimines of the formula (I) wherein $R^1$ and $R^2$ are methyl, $R^3$ is hydrogen and $R^4$ is undecyl. These aldimines provide odourless membranes having low viscosity, fast and reliable curing properties and high flexibility at low temperatures.

Preferably A is an n-valent hydrocarbyl moiety of molecular weight in the range of 28 to 2,000 g/mol, particularly in the range of 84 to 600 g/mol, optionally containing ether groups. Such aldimines provide membranes having good mechanical properties, particularly high flexibility at low temperatures and high strength in warm conditions.

Preferably A is the moiety remaining when removing the primary amino groups of a polyamine selected from the group consisting of hexamethylene-1,6-diamine, 2-methylpentane-1,5-diamine, 3-aminomethyl-3,5,5-trimethylcyclohexylamine(isophoronediamine), 2,2,4- and 2,4,4-trimethylhexamethylenediamine, 1,3-bis(aminomethyl)benzene, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis-(aminomethyl)bicyclo[2.2.1]heptane, 3(4),8(9)-bis(aminomethyl)-tricyclo[5.2.1.0$^{2,6}$]decane, 1,2-diaminocyclohexane, 1,3-diaminocyclohexane, 1,4-diaminocyclohexane, 2,2,6-trimethylcyclohexane-1,4-diamine, 3,6-dioxaoctane-1,8-diamine, 4,7-dioxadecane-1,10-diamine, 4-aminomethyl-1,8-octanediamine, polyoxypropylene diamines and triamines with an average molecular weight in the range of 200 to 5,000 g/mol, preferably 200 to 2000 g/mol, more preferably 200 to 600 g/mol, 1,3-phenylene diamine, 1,4-phenylene diamine, 2,4- and 2,6-toluylene diamine and 4,4'-, 2,4'- and 2,2'-diaminodiphenylmethane.

In a particularly preferred embodiment of the invention A is the moiety remaining when removing the primary amino groups of hexamethylene-1,6-diamine. These aldimines provide membranes having particularly low viscosity and fast curing properties.

In another particularly preferred embodiment of the invention, A is the moiety remaining when removing the primary amino groups of isophoronediamine. These aldimines provide membranes having particularly low viscosity and high strength.

In another particularly preferred embodiment of the invention, A is the moiety remaining when removing the primary amino groups of a polyoxypropylene diamine or triamine with an average molecular weight in the range of 200 to 5,000 g/mol, preferably 200 to 2000 g/mol, more preferably 200 to 600 g/mol. These aldimines provide membranes having particularly low viscosity, fast curing properties and high elongation.

In a most preferred embodiment of the invention, A is the moiety remaining when removing the primary amino groups of a polyoxypropylene triamine with an average molecular weight in the range of 400 to 5,000 g/mol, preferably 400 to 500 g/mol, particularly Jeffamine® T-403 from Huntsman or a corresponding grade from BASF or Nitroil, or Jeffamine® T-5000 from Huntsman or a corresponding grade from BASF or Nitroil. These aldimines provide membranes with very fast curing properties and a good combination of high elongation and strength.

Preferred aldimines of the formula (I) are selected from the group consisting of N,N'-bis(2,2-dimethyl-3-lauroyloxypropylidene)-hexamethylene-1,6-diamine, N,N'-bis(2,2-dimethyl-3-lauroyloxypropylidene)-3-aminomethyl-3,5,5-trimethylcyclohexylamine, N,N'-bis(2,2-dimethyl-3-lauroyloxypropylidene)-polyoxypropylene diamine with an average molecular weight in the range of 700 to 4,600 g/mol and N,N',N''-tris(2,2-dimethyl-3-lauroyloxypropylidene)-polyoxypropylene triamine with an average molecular weight in the range of 1,200 to 5,800 g/mol.

These aldimines provide odourless membranes with good workability and fast curing properties, as well as high elongation and good strength when cured.

In a particularly preferred embodiment of the invention the aldimine of the formula (I) is N,N'-bis(2,2-dimethyl-3-lauroyloxypropylidene)-hexamethylene-1,6-diamine.

This aldimine provides odourless membranes with a particularly low viscosity and fast curing properties.

In another particularly preferred embodiment of the invention the aldimine of the formula (I) is N,N'-bis(2,2-dimethyl-3-lauroyloxypropylidene)-3-aminomethyl-3,5,5-trimethylcyclohexylamine. This aldimine provides odourless membranes with particularly low viscosity and high strength.

In another particularly preferred embodiment of the invention the aldimine of the formula (I) is N,N'-bis(2,2-dimethyl-3-lauroyloxypropylidene)-polyoxypropylene diamine or N,N',N''-tris(2,2-dimethyl-3-lauroyloxypropylidene)-polyoxypropylene triamine. These aldimines provide membranes having particularly low viscosity, fast curing properties and high elongation. Especially preferred are the trialdimines. They provide very fast curing properties and a good combination of high strength and high elongation.

In a particularly preferred embodiment of the invention, the liquid-applied membrane comprises a combination of at least two different aldimines of the formula (I). The use of more than one aldimine of the formula (I) gives the possibility to balance properties such as viscosity, cure speed, tensile strength and elongation in an optimal way.

Preferably, one of the two different aldimines of the formula (I) is a dialdimine and the other one is a trialdimine.

The trialdimine is preferably N,N',N''-tris(2,2-dimethyl-3-lauroyloxypropylidene)polyoxypropylene triamine with an average molecular weight in the range of 1,200 to 5,800 g/mol, preferably 1,200 to 1,300 g/mol.

The dialdimine is preferably selected from the group consisting of N,N'-bis(2,2-dimethyl-3-lauroyloxypropylidene)-hexamethylene-1,6-diamine and N,N'-bis(2,2-dimethyl-3-lauroyloxypropylidene)-3-aminomethyl-3,5,5-trimethylcyclohexylamine.

Such membranes show an unexpectedly good combination between low viscosity, fast curing properties, high strength and high elongation.

Aldimines of the formula (I) are preferably available from a condensation reaction of at least one amine of the formula (III) and at least one aldehyde of the formula (IV).

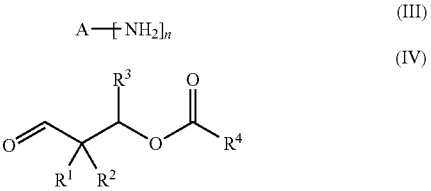

In the formula (III) and (IV), A, n, $R^1$, $R^2$, $R^3$ and $R^4$ have the already mentioned meanings.

For this condensation reaction, the aldehyde of the formula (IV) is used stochiometrically or in excess related to the primary amino groups of the amine of the formula (III). The reaction can advantageously be conducted at a temperature in the range between 15 and 120° C., either in the presence of a solvent or without a solvent. The released water is being removed either azeotropically with a suitable solvent, or directly under vacuum.

The one-part moisture-curing liquid-applied waterproofing membrane further comprises at least one oxazolidine of the formula (II).

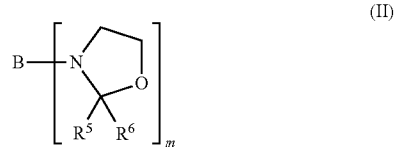

Preferably B is an m-valent hydrocarbyl moiety of molecular weight in the range of 118 to 500 g/mol containing carbonate or urethane groups.

Preferably $R^5$ is hydrogen.

Preferably $R^6$ is a $C_3$ to $C_7$ branched alkyl. Particularly preferred are 2-propyl and 3-heptyl.

Preferably m is 2.

Such oxazolidines provide membranes with high elongation and high strength. Particularly preferred are oxazolidines of the formula (II) wherein $R^5$ is hydrogen and $R^6$ is 2-propyl or 3-heptyl.

Particularly preferred are oxazolidines wherein the formula (II) corresponds to the formula (II a) or (II b).

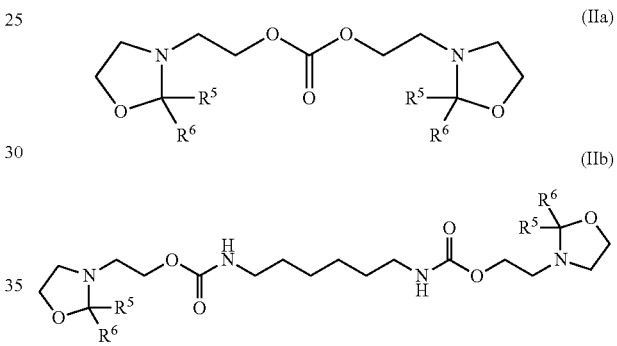

In the formula (II a) and (II b) $R^5$ and $R^6$ have the already mentioned meanings.

The oxazolidines of the formula (II a) and (II b) are derivatives of N-(2-hydroxyethyl)-tetrahydrooxazoles, the latter being obtainable via the condensation reaction of diethanolamine with aldehydes or ketones, particularly with isobutyraldehyde or 2-ethylhexanal.

The oxazolidines of the formula (II a) are obtainable by the reaction of an N-(2-hydroxyethyl)-tetrahydrooxazole with an organic carbonate.

The oxazolidines of the formula (II b) are obtainable by the reaction of an N-(2-hydroxyethyl)-tetrahydrooxazole with 1,6-hexanediisocyanate (HDI).

These oxazolidines enable membranes with good workability, good elongation and high strength.

Examples for commercially available oxazolidines of the formula (II) are Hardener OZ (from Bayer), Zoldine® RD-4 (from Angus Chemical), as well as Incozol® LV, Incozol® 4, Incozol® HP, Incozol® NC, Incozol® CF, Incozol® EH and Incozol® K (from Incorez).

In the liquid-applied membrane, the ratio between the number of aldimino groups and the number of oxazolidino groups is in the range of 80/20 to 20/80.

In this range, the membrane features good shelf life stability, fast and reliable curing properties and good mechanical properties.

If the aldimino/oxazolidino ratio is above 80/20, the membrane is too soft and has a low tensile strength.

If the aldimino/oxazolidino ratio is below 20/80, the membrane has a low shelf life stability, insufficient curing properties, in particular long skinning time, and is limited in elongation.

Preferably the aldimino/oxazolidino ratio is in the range of 75/25 to 25/75. In this range, the membrane is fast curing, has a very good shelf life stability, also at low solvent content, and a good combination of high strength and high elongation.

More preferably, the aldimino/oxazolidino ratio is in the range of 70/30 to 30/70.

In this range, the membrane is fast curing, has a very good shelf life stability, and particularly high strength and elongation.

Preferably the contents of aldimine and oxazolidine in the liquid-applied membrane is such that the ratio between the total number of blocked amino and hydroxyl groups to the number of isocyanate groups is in the range of 0.3 to 1.0, preferably in the range of 0.4 to 1.0, more preferably in the range of 0.6 to 1.0.

In this range, the membrane cures without the formation of bubbles or blisters, resulting in a high strength material.

Preferably the content of the isocyanate-functional polyurethane polymer in the liquid-applied membrane is in the range of 15 to 70 weight-%, more preferably 15 to 60 weight-%, particularly 15 to 50 weight-%.

Besides the ingredients already mentioned, the membrane may comprise further ingredients.

Preferably the liquid-applied membrane comprises at least one filler. Fillers help to develop strength and durability.

Preferred fillers are inorganic fillers, particularly calcium carbonate ("chalk"), such as ground calcium carbonate (GCC) and precipitated calcium carbonate (PCC), barium sulfate (barytes), slate, silicates (quartz), magnesiosilicates (talc), alumosilicates (clay, kaolin), dolomite, mica, glass bubbles and silicic acid, in particular highly dispersed silicic acids from pyrolytic processes (fumed silica). These fillers may or may not carry a surface coating, e.g. a stearate or siloxane coating.

Further preferred fillers are organic fillers, particularly carbon black and microspheres.

Preferably the liquid-applied membrane further comprises at least one pigment. The pigment defines the colour of the membrane, helps to develop strength and increases durability, particularly UV-stability.

Preferred pigments are titanium dioxide, iron oxides and carbon black.

Preferably the liquid-applied membrane further comprises at least one flame-retarding filler. Preferred flame-retarding fillers are aluminum trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine orthophosphate, di-melamine pyrophosphate, hexabromocyclododecane, decabromodiphenyl oxide and tris(bromoneopentyl)phosphate.

Preferably the liquid-applied membrane further comprises at least one flame-retarding plasticizer, particularly a phosphate or a phosphonate, particularly triphenyl phosphate (TPP), diphenyl-tert.butylphenyl phosphate, diphenylcresyl phosphate (DPK), tricresyl phosphate (TKP), triethyl phosphate, tris(2-ethylhexyl)phosphate, diphenyl-2-ethylhexyl phosphate (DPO), tris(2-ethylhexyl)phosphate (TOF), diphenylisodecyl phosphate, dimethyl propane phosphonate (DMPP), tetraphenyl resorcinol diphosphate, resorcinol diphosphate oligomer (RDP), ethylenediamine diphosphate, as well as chloroalkyl phosphate esters such as tris(1-chloro-2-propyl)phosphate, tris(1,3-dichloro-2-propyl)phosphate and 2,2-bis(chloromethyl)trimethylene bis(bis(2-chloroethyl)phosphate).

Preferably the liquid-applied membrane further comprises at least one polyisocyanate crosslinker with an NCO-functionality of greater than two, particularly oligomers, polymers or derivatives of the already mentioned diisocyanates. Preferred aliphatic polyisocyanate crosslinkers are HDI-biurets, such as Desmodur® N 100 and N 3200 (from Bayer), Tolonate® HDB and HDB-LV (from Rhodia) and Duranate® 24A-100 (from Asahi Kasei); HDI-isocyanurates, such as Desmodur® N 3300, N 3600 and N 3790 BA (from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uretdiones, such as Desmodur® N 3400 (from Bayer); HDI-iminooxadiazinediones, such as Desmodur® 3900 (from Bayer); HDI-allophanates, such as Desmodur® VP LS 2102 (from Bayer) and Basonat® HA 100, Basonat® HA 200 and Basonat® HA 300 (all from BASF); IPDI-isocyanurates, such as Desmodur® Z 4470 (from Bayer) and Vestanat® T1890/100 (from Evonik); mixed isocyanurates based on IPDI/HDI, such as Desmodur® NZ 1 (from Bayer). Preferred aromatic polyisocyanate crosslinkers are TDI-oligomers, such as Desmodur® IL (from Bayer); modified MDI containing carbodiimides or uretonimines of MDI, such as the already mentioned ones. Mixed aromatic/aliphatic polyisocyanate crosslinkers may also be used, in particular isocyanurates based on TDI/HDI, such as Desmodur® HL (from Bayer).

Aliphatic polyisocyanate crosslinkers are particularly preferred in membranes containing isocyanate-functional polyurethane polymers based on aliphatic polyisocyanates.

Particularly preferred are IPDI-isocyanurates and mixed isocyanurates containing IPDI.

Preferably the liquid-applied membrane further comprises at least one metal-based catalyst accelerating the reaction of the isocyanate groups. Preferred metal-based catalysts are dialkyltin complexes, particularly dimethyltin, dibutyltin or dioctyltin carboxylates, mercaptides or acetoacetonates, such as DMTDL, DBTDL, DBT(acac)$_2$, DOTDL, dioctyltin (IV)neodecanoate or DOT(acac)$_2$, bismuth(III) complexes, such as bismuth(III)octoate or bismuth(III)neodecanoate, zinc(II) complexes, such as zinc(II)octoate or zinc(II)neodecanoate, and zirconium(IV) complexes, such as zirconium (IV)octoate or zirconium(IV)neodecanoate.

Preferably the liquid-applied membrane further comprises at least one acid catalyst accelerating the hydrolysis of the aldimino and oxazolidino groups. Preferred acid catalysts are carboxylic acids and sulfonic acids, particularly aromatic carboxylic acids, such as benzoic acid or salicylic acid.

Preferably the liquid-applied membrane further comprises at least one UV-stabilizer. Preferred UV-stabilizers are UV-absorbers, such as benzophenones, benzotriazoles, oxalanilides, phenyltriazines and particularly 2-cyano-3,3-diphenylacrylic acid ethyl ester, and hindered amine light stabilizers (HALS), such as bis(1,2,2,6,6-pentamethyl-4-piperidyl) sebacate and other compounds containing at least one 1,2,2,6,6-pentamethyl-4-piperidinyl moiety. UV-stabilizers help to prevent the polymer from degradation under light exposure.

The liquid-applied membrane may further comprise the following ingredients:
- other polyisocyanates, such as other isocyanate-functional polyurethane polymers, particularly those based on MDI, TDI, IPDI or HDI;

blocked amine hardeners other than aldimines of the formula (I) and oxazolidines of the formula (II), particularly other aldimines;

plasticizers other than phosphates and phosphonates, particularly phthalates, trimellitates, succinates, glutarates, adipates, sebacates, azelates, citrates, benzoates, acetylated glycerin or monoglycerides, hydrogenated phthalates, fatty acid esters, arylsulfonates or hydrocarbon resins;

organic solvents, such as hydrocarbons, esters or ethers, particularly acetyl acetone, mesityloxide, cyclohexanone, methylcyclohexanone, ethyl acetate, propyl acetate, 1-methoxy-2-propylacetate, butyl acetate, diethyl malonate, diisopropylether, diethylether, dibutylether, ethylene glycol diethylether, diethylene glycol diethylether, toluene, xylenes, heptanes, octanes, diisopropylnaphthalenes and petroleum fractions, such as naphtha, white spirits and petroleum ethers, such as Solvesso™ solvents (from Exxon), hydrogenated aromatic solvents such as hydrogenated naphtha, methylene chloride, propylene carbonate, butyrolactone, N-methyl-pyrrolidone and N-ethyl-pyrrolidone;

additives, such as wetting agents, flow enhancers, levelling agents, defoamers, deaerating agents, drying agents, antioxidants, adhesion promoters, rheology modifiers, particularly fumed silica, and biocides.

When using such further ingredients it is advantageous to ensure that they do not strongly impair the shelf life stability of the uncured membrane, i.e., do not massively trigger reactions leading to crosslinking of the polymer during storage. In particular these further ingredients should not contain any water above trace quantities. It can be advantageous to dry ingredients physically or chemically before use.

Preferably the liquid-applied membrane comprises at least one ingredient selected from the group consisting of inorganic fillers and pigments, at least one ingredient selected from the group consisting of flame-retarding plasticizers and flame-retarding fillers, and at least one ingredient selected from the group consisting of catalysts, plasticizers, solvents and UV-stabilizers.

These further ingredients provide membranes with good shelf life stability, good workability, fast curing properties as well as high strength and durability, which have a low tendency to develop flames and smoke in case of fire. Such membranes are highly suitable for applications on a roof.

Preferably the liquid-applied membrane has a filler content in the range of 20 to 80 weight-%, more preferably in the range of 30 to 60 weight-%, the filler including inorganic, organic and flame-retarding fillers and pigments. At this filler content the membrane provides high strength and durability.

A particularly preferred membrane contains from 15 to 70 weight-% isocyanate-functional polyurethane polymers;

from 20 to 80 weight-% fillers including inorganic fillers, flame-retarding fillers and pigments;

from 5 to 30 weight-%, preferably from 5 to 20 weight-%, plasticizers including flame-retarding plasticizers;

and comprises at least one further ingredient selected from the group consisting of catalysts, solvents and UV-stabilizers.

Preferably, it comprises at least one flame-retarding ingredient selected from the group consisting of flame-retarding fillers and flame-retarding plasticizers. Such a membrane has good shelf life stability, good workability at low solvent content, good mechanical properties and durability and a low tendency to develop flames and smoke in case of fire.

Preferably the liquid-applied membrane has a low viscosity. This enables a good workability when applied as a self-levelling coating. Particularly the membrane has a Brookfield viscosity in the range of 2,000 to 15,000 mPa·s at 20° C., preferably in the range of 2,000 to 10,000 mPa·s at 20° C. In this viscosity range the membrane is self-levelling enough to allow easy application on flat or low slope roof surfaces but does not flow away into small cavities on the substrate surface.

Preferably the liquid-applied membrane has a low solvent content; most preferably it contains 50 g VOC per liter or less. At such low solvent content the membrane fulfills toughest VOC specifications, e.g. those of the South Coast Air Quality Management District.

State-of-the-art one-part moisture-curing liquid-applied waterproofing membranes based on isocyanate-functional polyurethane polymers and blocked amine hardeners are difficult to formulate at low solvent content. Especially low viscosity and sufficient shelf life stability is difficult to achieve without the use of high amounts of solvents. In this invention it was surprisingly found that the use of an aldimine of the formula (I) in one-part moisture-curing liquid-applied waterproofing membranes comprising an isocyanate-functional polyurethane polymer and an oxazolidine is an effective method to reduce the viscosity and enhance shelf life stability, thus allowing to decrease solvent contents and providing the opportunity to formulate high-end yet low VOC and low odour waterproofing membranes. In addition, it was surprisingly found that the use of an aldimine of the formula (I) in an oxazolidine-based membrane is an effective method to significantly accelerate curing.

A further subject of the invention is the use of at least one aldimine of the formula (I) as a diluent in a one-part moisture-curing liquid-applied waterproofing membrane comprising at least one isocyanate-functional polyurethane polymer and at least one oxazolidine of the formula (II).

Preferably the aldimine of the formula (I) is used in an amount corresponding to an aldimino to oxazolidino group ratio in the range of 80/20 to 20/80, preferably in the range of 75/25 to 35/65, more preferably in the range of 60/40 to 40/60. This use provides membranes having a low viscosity at low solvent content, good shelf life stability, fast curing properties, as well as high elongation and high strength after curing.

The one-part moisture-curing liquid-applied waterproofing membrane may be prepared by mixing all ingredients under exclusion of moisture to obtain a homogeneous fluid. It may be stored in a suitable moisture-tight container, particularly a bucket, a drum, a hobbock, a bag, a sausage, a cartridge, a can or a bottle.

The membrane is applied in liquid state within its open time, typically by pouring it onto the substrate, followed by spreading it, e.g. with a roller or a squeegee, to get the desired layer thickness, which is typically in the range of 0.5 to 3 mm, particularly 0.75 to 1.5 mm.

"Open time" means hereby the period of time between the exposure to moisture and the formation of a skin on the surface of the membrane, also called "tack-free time" or "skinning time".

The membrane is self-levelling, which means its viscosity is low enough to develop an even surface after being spread by rolling or brushing.

The curing of the membrane starts when it gets in contact with moisture, typically atmospheric moisture. The curing process works by chemical reaction. Both aldimino and oxazolidino groups are activated with moisture and then react with isocyanate groups. On activation, each aldimino group forms a primary amino group, while each oxazolidino group forms a secondary amino group and a hydroxyl group. Furthermore, the isocyanate groups can also react directly with moisture. As a result of these reactions, the membrane cures to a solid, elastic material. The curing process may also be called crosslinking. After curing, an elastic material with a very good adhesion to a large number of substrates is obtained.

In the course of the curing reaction, the blocking agents of the aldimines and oxazolidines present in the membrane are released. In the case of an aldimine of the formula (I), the blocking agent is an aldehyde of the formula (IV); in the case of an oxazolidine of formula (II), it is an aliphatic aldehyde or ketone, preferably an aldehyde. These blocking agents, depending on their volatility and other factors such as their solubility in the membrane, may evaporate from the membrane during or after curing, or may remain in the cured membrane. The latter is particularly the case for aldehydes of the formula (IV), which are of low volatility and have little odour or are odourless. This reduces odour, emission and shrinkage of the membrane. The preferred aldimines of the formula (I) release 2,2-dimethyl-3-lauroyloxypropanal, which is completely odourless and remains almost completely in the cured membrane, being compatible with the crosslinked polyurethane polymer and acting as a plasticizer.

The membrane can be applied onto various substrates, forming an elastic coating on the substrate. It can be used particularly for waterproofing a roof, a roof deck or a roof garden, as well as a planter, a balcony, a terrace, a plaza, or a foundation. It can also be used indoors for waterproofing, particularly under ceramic tiles, e.g. in a bath room, a catering kitchen or a plant room, protecting them from water ingress. The membrane is particularly suitable for refurbishment purposes.

Most preferred is the use of the liquid-applied membrane on a roof, particularly a flat or low slope roof. It can be used to waterproof a new roof as well as for refurbishment purposes and is particularly useful for detailing work.

The liquid-applied membrane is preferably used as part of a waterproofing system, consisting of
  optionally a primer and/or an undercoat,
  one or more than one layers of the membrane, preferably in combination with a fibre reinforcement mesh, and
  optionally a top coat.

The membrane is preferably used by being poured onto a substrate, being spread evenly within its open time to the desired layer thickness, typically in the range of 0.5 to 3 mm, particularly in the range of 0.75 to 1.5 mm, by a roller, a brush, a spreading knife or a wiper.

Preferably the fibre reinforcement mesh is applied after the first layer of the membrane, by placing it on top of the freshly applied membrane and then rolling or working it thoroughly into the membrane within the open time of the membrane, particularly by means of a roller or a brush. The membrane with the incorporated fibre reinforcement mesh is then cured at least to the point that it can be walked on, before an optional next layer of the membrane is applied.

It can be advantageous to apply a top coat onto the top layer of the membrane, such as a covering lacquer or the like. Especially for liquid-applied membranes based on aromatic isocyanates, it is advantageous to apply an UV-resistant top coat onto the cured membrane.

Another subject of the invention is a method of waterproofing a roof structure, comprising
  applying the membrane in liquid state onto a substrate of the roof structure in a layer thickness in the range of 0.5 to 3 mm, particularly in the range of 0.75 to 1.5 mm;
  contacting the membrane with a fibre reinforcement mesh within the open time of the membrane;
  exposing the membrane to moisture to thereby cure the membrane partially or fully to obtain an elastic coating;
  optionally applying a second layer of the membrane in a layer thickness in the range of 0.5 to 3 mm, particularly in the range of 0.75 to 1.5 mm, and curing it by exposure to moisture.

The fibre reinforcement mesh is preferably a non-woven polyester fibre mesh and more preferably a non-woven glass fibre mesh.

The fibre reinforcement mesh acts as a reinforcement for the membrane, providing increased strength and durability. The randomly orientated fibres in the preferred non-woven fibre meshes give a multidirectional strength to the membrane while allowing it to remain highly elastic. It improves strength, tear resistance and puncture resistance. The non-woven glass fibre mesh shows a particularly easy handling, as it is not stiff, but easily adapts to the given surface topography.

Substrates onto which the membrane can be applied are particularly
  concrete, lightweight concrete, mortar, brick, adobe, tile, slate, gypsum and natural stone, such as granite or marble;
  metals and alloys, such as aluminium, copper, iron, steel, nonferrous metals, including surface-finished metals and alloys, such as galvanized metals and chrome-plated metals;
  asphalt;
  bituminous felt;
  plastics, such as PVC, ABS, PC, PA, polyester, PMMA, SAN, epoxide resins, phenolic resins, PUR, POM, PO, PE, PP, EPM, EPDM in untreated form or surface treated by means of plasma, corona or flame; particularly PVC, PO (FPO, TPO) or EPDM membranes;
  coated substrates, such as varnished tiles, painted concrete and coated metals.

It can be advantageous to pre-treat the substrate before applying the membrane, for example by washing, pressure-washing, wiping, blowing off, grinding and/or applying a primer and/or an undercoat.

By this method, a waterproof roof structure is obtained comprising the cured membrane with the incorporated fibre reinforcement mesh.

The roof structure is preferably part of the roof of a building, particularly a building from structural and civil engineering, preferably a house, an industrial building, a hangar, a shopping center, a sports stadium or the like.

The one-part moisture-curing liquid-applied waterproofing membrane described herein has a series of advantages. It has low odour, a long shelf life stability and a low viscosity at low solvent content, even when containing only about 50 g VOC per liter or less. Being a one-part system, there is no mixing step required, which facilitates application. It has a sufficiently long open time to allow hand application, making the use of special equipment such as spraying machines unnecessary. Its open time can be adjusted in a wide range, in particular by the selection and amount of catalysts. When contacted with moisture, it cures surprisingly fast to a solid walkable material. After full curing, the membrane is an elastic material having high strength, elongation and durability. Preferably it has a tensile strength of at least 3.5 MPa, more preferably at least 4 MPa, and most preferably at least 5 MPa. Preferably it has an elongation at break of at least 200%, more preferably at least 300%, and most preferably at least 350%.

With these properties the membrane is able to protect a building over a long period of time from water ingress in a broad temperature range.

EXAMPLES

"Normal climate" means a temperature of 23±1° C. and a relative atmospheric moisture of 50±5%.

The amine content (total content of free amines and blocked amines, i.e. aldimino groups) of the prepared aldimines was determined by titration (with 0.1 N $HClO_4$ in acetic acid against cristal violet) and is given in mmol N/g.

1. Used Substances:

| | |
|---|---|
| IPDI trimer | Isocyanurate of IPDI, 70 weight-% in solventnaphta 100, NCO content 11.9 wt-% (Desmodur ® Z 4470 SN from Bayer). |
| Oxazolidine | Bis-oxazolidine of the Formula (II b); equivalent weight 125 g (Incozol ® 4 from Incorez). |
| Aldimine-1 | N,N'-bis(2,2-dimethyl-3-lauroyloxypropylidene)-3-aminomethyl-3,5,5-trimethylcyclohexylamine; with an equivalent weight of 367 g. |
| Aldimine-2 | N,N',N"-tris(2,2-dimethyl-3-lauroyloxypropylidene)-polyoxypropylene triamine with an average molecular weight of about 1245 g/mol; with an equivalent weight of 449 g/Eq (derived from Jeffamine ® T-403 from Huntsman). |
| Aldimine-3 | N,N'-bis(2,2-dimethyl-3-lauroyloxypropylidene)-hexamethylene-1,6-diamine; with an equivalent weight of 351 g. |
| DBTDL | Dibutyltin dilaurate (Sigma Aldrich) |
| HALS | Bis-(1,2,2,6,6-pentamethyl-4-piperidyl) sebacate |
| DPK | Diphenylcresyl phosphate (Disflamoll ® DPK from Lanxess). |
| ATH | Aluminum trihydroxide |

The Polymer-1 was prepared by reacting 906.1 g polyoxypropylene diol with an average molecular weight of ca. 1000 g/mol (Voranol® 1010 L from Dow), 28.1 g 1,4-butanediol and 514.4 g isophoronediisocyanate (Vestanat® IPDI from Evonik) in the presence of 1.4 g dibutyltin dilaurate (DBTDL) according to known procedures at 80° C. to obtain an isocyanate-functional polyurethane polymer with an NCO content of 6.34 weight-%.

The Polymer-2 was prepared by reacting 290.4 g polyoxypropylene diol with an average molecular weight of ca. 2000 g/mol (Voranol® 2000 L from Dow), 838.8 g polyoxypropylene diol with an average molecular weight of 4000 g/mol (Acclaim® 4200 from Bayer), 9.8 g 1,4-butanediol and 361.0 g MDI (Desmodur® VL 50 from Bayer according to known procedures at 90° C. to obtain an isocyanate-functional polyurethane polymer with NCO content 5.2 weight-%.

Aldimine-1: N,N'-bis(2,2-dimethyl-3-lauroyloxypropylidene)-3-aminomethyl-3,5,5-trimethylcyclohexylamin 598 g (2.1 mol) 2,2-dimethyl-3-lauroyloxy-propanal were placed in a round bottom flask under nitrogen atmosphere. Then 170.3 g (1 mol) 3-aminomethyl-3,5,5-trimethylcyclohexylamine (Vestamin® IPD from Evonik) were added under good stirring, followed by removing the volatile contents at 80° C. and 10 mbar vacuum. The yield was 732 g of a nearly colourless liquid with an amine content of 2.73 mmol N/g, corresponding to a calculated aldimine equivalent weight of approx. 367 g/Eq.

Aldimine-2: N,N',N"-tris(2,2-dimethyl-3-lauroyloxypropylidene)-polyoxypropylenetriamine Under the same conditions as given for Aldimine-1, 875 g (3.08 mol) 2,2-dimethyl-3-lauroyloxy-propanal and 440 g (ca. 2.8 mol N) polyoxypropylenetriamine of average molecular weight of about 440 g/mol (Jeffamine® T-403 from Huntsman, amine content 6.40 mmol N/g) were reacted. The yield was 1,264 g of a nearly colourless liquid with an amine content of 2.23 mmol N/g, corresponding to a calculated aldimine equivalent weight of approx. 449 g/Eq.

Aldimine-3: N,N'-bis(2,2-dimethyl-3-lauroyloxypropylidene)-hexamethylene-1,6-diamine Under the same conditions as given for Aldimine-1, 622 g (2.2 mol) 2,2-dimethyl-3-lauroyloxy-propanal and 166.0 g (1 mol) hexamethylene-1,6-diamine solution (70 weight-% in water) were reacted. The yield was 702 g of a nearly colourless liquid with an amine content of 2.85 mmol N/g, corresponding to a calculated aldimine equivalent weight of approx. 351 g/Eq.

2. Unfilled One-Part Moisture-Curing Liquid-Applied Waterproofing Membranes

For each membrane the ingredients given in Table 1 were mixed under exclusion of moisture in a sealed polypropylene beaker by means of a centrifugal mixer (SpeedMixer™ DAC 150, FlackTek Inc.) until a homogeneous fluid was obtained.

The membranes were stored in a tightly sealed, moisture-proof can for 24 hours at ambient temperature and then tested as follows:

To determine the mechanical properties, a two-layer cured film was prepared for each membrane. To prepare the film, a first layer of 800 µm thickness was applied with a draw down bar and left curing in normal climate (NC) for 24 hours; then a second layer of 400 µm thickness was applied thereon at an angle of 90° and again left curing in NC for 24 hours; the two-layer film was then placed it an oven at 60° C. for 24 hours. After an additional 24 hours in NC, dumbbells with a length of 75 mm, a crosspiece length of 30 mm and a crosspiece width of 4 mm were punched from the film and tensile strength and elongation at break determined according to DIN EN 53504 at a crosshead speed of 200 mm/min.

The cured free films of each of the membranes were clear, bubble-free and non-tacky.

The results are given in Table 1.

The liquid-applied membranes Ex-1 to Ex-3 are examples according to the invention, the liquid-applied membranes Ref-1 and Ref-2 are comparative examples.

Table 1 shows the influence of different aldimine and oxazolidine combinations on the mechanical properties of cured unfilled membranes.

TABLE 1

Composition (in weight parts) and test results of the membranes Ex-1 to Ex-3 and Ref-1 to Ref-2

| | Ref-1 | Ex-1 | Ex-2 | Ex-3 | Ref-2 |
|---|---|---|---|---|---|
| Polymer-1 | 465.3 | 465.3 | 465.3 | 465.3 | 465.3 |
| Solvent [1] | 176.5 | 176.5 | 176.5 | 176.5 | 176.5 |
| IPDI trimer | 65.2 | 65.2 | 65.2 | 65.2 | 65.2 |
| Oxazolidine | 110.0 | 88.0 | 54.8 | 38.3 | — |
| Aldimine-1 | — | 12.9 | 15.4 | 23.3 | 45.0 |
| Aldimine-2 | — | 75.1 | 85.0 | 128.3 | 243.0 |

TABLE 1-continued

Composition (in weight parts) and test results of the membranes Ex-1 to Ex-3 and Ref-1 to Ref-2

|  | Ref-1 | Ex-1 | Ex-2 | Ex-3 | Ref-2 |
|---|---|---|---|---|---|
| DBTDL | 0.2 | 0.2 | 0.2 | 0.2 | 0.2 |
| Salicylic acid | 0.70 | 0.8 | 0.8 | 0.8 | 0.8 |
| Aldim./Oxazol. Ratio [2] | 0/100 | 37/63 | 51/49 | 70/30 | 100/0 |
| Tensile Strength [MPa] | 12.76 | 11.5 | 10.23 | 9.67 | 2.27 |
| Elongation at Break [%] | 369 | 531 | 548 | 610 | 526 |

[1] 1-methoxy-2-propylacetate
[2] ratio between aldimino groups and oxazolidino groups 3. Filled Aliphatic One-Part Moisture-Curing Liquid-Applied Waterproofing Membranes For each membrane the following ingredients were mixed under exclusion of moisture in a sealed polypropylene beaker by means of a centrifugal mixer (SpeedMixer™ DAC 150, FlackTek Inc.) until a homogeneous fluid was obtained:

554.7 weight parts of the Polymer-1,
58.6 weight parts of 1-methoxy-2-propylacetate,
71.5 weight parts of IPDI trimer,
278.9 weight parts of titanium dioxide,
545.3 weight parts of ATH,
213.1 weight parts of barytes,
18.4 weight parts of fumed silica,
26.9 weight parts of carbon black,
10.0 weight parts of HALS,
0.2 weight parts of DBTDL,
0.8 weight parts of salicylic acid and
the ingredients given in Table 2.

The membranes were stored in a tightly sealed, moisture-proof can for 24 hours at ambient temperature and then tested as follows:

The viscosity was measured with a Brookfield DV-E spindle type viscometer, spindle n° 5, 30 rpm, at a temperature of 20° C. "Initial" means the viscosity measured 24 hours after mixing the ingredients. "28 d 40° C." means the viscosity measured after an additional storage time of 28 days at 40° C. "42 d 40° C." means the viscosity measured after an additional storage time of 42 days at 40° C.

Cure speed ("BK drying time") was determined at 20° C./45% relative humidity using a Beck-Koller drying time recorder according to ASTM D5895. The result for stage 2 indicates approximately the skinning time of the membrane.

Tensile strength and elongation at break were measured as described for the unfilled membranes of Table 1.

The cured free films of each of the membranes were bubble-free and non-tacky.

The results are given in Table 2.

The liquid-applied membranes Ex-4 to Ex-6 are examples according to the invention, the liquid-applied membranes Ref-3 and Ref-4 are comparative examples.

Table 2 shows filled, low-VOC membranes based on a polyurethane polymer obtained from aliphatic polyisocyanate.

TABLE 2

Composition (in weight parts) and test results of the examples Ex-4 to Ex-6 and Ref-3 to Ref-4

|  |  | Ref-3 | Ex-4 | Ex-5 | Ex-6 | Ref-4 |
|---|---|---|---|---|---|---|
| Ingredients Given Above |  | 1'778.4 | 1'778.4 | 1'778.4 | 1'778.4 | 1'778.4 |
| DPK |  | 524.6 | 464.8 | 446.9 | 428.9 | 405.0 |
| Oxazolidine |  | 120.6 | 96.4 | 80.0 | 55.9 | — |
| Aldimine-1 |  | — | 14.2 | 22.5 | 34.0 | 63.6 |
| Aldimine-2 |  | — | 82.3 | 128.2 | 187.4 | 356.1 |
| Aldim./Oxazol. Ratio [2] |  | 0/100 | 37/63 | 52/48 | 70/30 | 100/0 |
| Viscosity [mPa · s], initial |  | 6'400 | 5'600 | 5'200 | 5'300 | 4'000 |
| Viscosity [mPa · s], 28 d 40° C. |  | 14'240 | 11'300 | 9'100 | 7'400 | 4'900 |
| BK Drying Time [h] | Stage 2 | >12 | 5.5 | 6 | 7.5 | 6.5 |
|  | Stage 3 | >12 | 11.5 | 10.5 | 8 | 7.5 |
|  | Stage 4 | >12 | >12 | >12 | >12 | >12 |
| Tensile Strength [MPa] |  | 4.99 | 6.49 | 5.38 | 4.40 | 3.40 |
| Elongation at Break [%] |  | 244 | 349 | 322 | 367 | 432 |

[2] ratio between aldimino groups and oxazolidino groups

4. Filled Aromatic One-Part Moisture-Curing Liquid-Applied Waterproofing Membranes For each membrane the following ingredients were mixed under exclusion of moisture in a sealed polypropylene beaker by means of a centrifugal mixer (SpeedMixer™ DAC 150, FlackTek Inc.) until a homogeneous fluid was obtained:

652.1 weight parts of the Polymer-2,
569.5 weight parts of xylene,
160.8 weight parts of titanium dioxide,
221.1 weight parts of barytes,
881.9 weight parts of chalk,
40.4 weight parts of fumed silica,
202.0 weight parts of diisodecyl phthalate and
the ingredients given in Table 3.

The membranes were stored in a tightly sealed, moisture-proof can for 24 hours at ambient temperature and then tested in the same way as the filled aliphatic membranes of Table 2.

The test results are given in Table 3.

The membranes Ex-7 and Ex-8 are examples according to the invention, the membranes Ref-5 and Ref-6 are comparative examples.

Table 3 shows filled membranes based on a polyurethane polymer obtained from aromatic polyisocyanate.

TABLE 3

Composition (in weight parts) and test results of the examples
Ex-7, Ex-8, Ref-5 and Ref-6

|  | Ref-5 | Ex-7 | Ex-8 | Ref-6 |
|---|---|---|---|---|
| Ingredients Given Above | 2'727.8 | 2'727.8 | 2'727.8 | 2'727.8 |
| Oxazolidine | 91.3 | 45.7 | 45.7 | 68.5 |
| Aldimine-1 | — | 45.7 | — | — |
| Aldimine-3 | — | — | 45.7 | 22.8 |
| Aldim./Oxazol. Ratio [1] | 0/100 | 41/59 | 42/58 | 19/81 |
| Viscosity [mPa·s], initial | 9'500 | 8'500 | 9'000 | 10'000 |
| Viscosity [mPa·s], 42 d 40° C. | 26'000 | 18'000 | 19'000 | 25'000 |
| Tensile strength [MPa] | 4.1 | 3.9 | 3.6 | 4.0 |
| Elongation at break [%] | 178 | 223 | 242 | 204 |

[1] ratio between aldimino groups and oxazolidino groups

The invention claimed is:

1. A one-part moisture-curing liquid-applied waterproofing membrane comprising:
   at least one isocyanate-functional polyurethane polymer based on an aliphatic polyisocyanate;
   at least one aldimine of the formula (I),

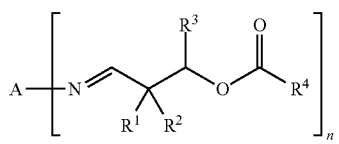

wherein
   A is an n-valent hydrocarbyl moiety of molecular weight in the range of 28 to 5000 g/mol optionally containing ether or urethane groups,
   $R^1$ and $R^2$ are the same or different $C_1$ to $C_{12}$ linear or branched alkyls, or are joined together to form a divalent linear or branched $C_4$ to $C_{12}$ hydrocarbyl moiety which is part of a 5- to 8-membered carbocyclic ring,
   $R^3$ is hydrogen or a linear or branched $C_1$ to $C_{12}$ alkyl or arylalkyl or alkoxycarbonyl,
   $R^4$ is a monovalent $C_6$ to $C_{20}$ hydrocarbyl moiety optionally containing ether, carbonyl or ester groups, and n is from 2 to 6; and
   at least one oxazolidine of the formula (II),

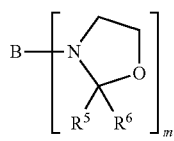

wherein
   B is a m-valent hydrocarbyl moiety of molecular weight in the range of 28 to 2000 g/mol optionally containing ether, ester, amide, carbonate, urethane, or urea groups,
   $R^5$ is selected from hydrogen or $C_1$ to $C_{12}$ linear or branched alkyl,
   $R^6$ is a $C_3$ branched alkyl, and
   m is 2 or 3;
   wherein the ratio between the number of aldimino groups and the number of oxazolidino groups is in the range of 80/20 to 20/80.

2. The membrane according to claim 1, wherein the aldimine of the formula (I) is selected from the group consisting of N,N'-bis(2,2-dimethyl-3-lauroyloxypropylidene)-hexamethylene-1,6-diamine, N,N'-bis(2,2-dimethyl-3-lauroyloxypropylidene)-3-aminomethyl-3,5,5-trimet-hyl-cyclohexylamine, N,N'-bis(2,2-dimethyl-3-lauroyloxypropylidene)-polyoxypropylene diamine with an average molecular weight in the range of 700 to 4,600 g/mol, and N,N',N''-tris(2,2-dimethyl-3-lauroyloxypropylidene)-polyoxypropylene triamine with an average molecular weight in the range of 1,200 to 5,800 g/mol.

3. The membrane according to claim 1 comprising:
   a combination of at least two different aldimines of the formula (I).

4. The membrane according to claim 1, wherein $R^5$ is hydrogen.

5. The membrane according to claim 1, wherein the formula (II) corresponds to the formula (II a) or (II b):

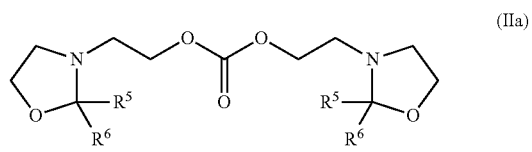

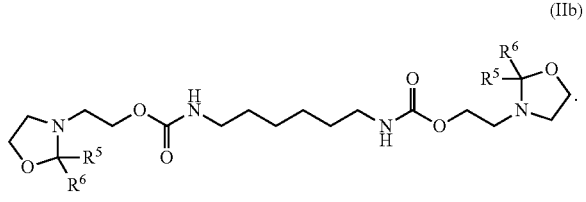

6. The membrane according to claim 1 further comprising:
   at least one ingredient selected from the group consisting of inorganic fillers and pigments,
   at least one ingredient selected from the group consisting of flame-retarding plasticizers and flame-retarding fillers, and
   at least one ingredient selected from the group consisting of catalysts, plasticizers, solvents and UV-stabilizers.

7. The membrane according to claim 1 containing
   from 15 to 70 weight-% isocyanate-functional polyurethane polymers;
   from 20 to 80 weight-% of fillers including inorganic fillers, flame-retarding fillers and pigments;
   from 5 to 30 weight-% of plasticizers including flame-retarding plasticizers; and at least one further ingredient selected from the group consisting of catalysts, solvents and UV-stabilizers.

8. The membrane according to claim 1 having a Brookfield viscosity in the range of 2,000 to 15,000 mPas at 20° C.

9. The membrane according to claim 1 containing 50 g VOC per liter or less.

10. A waterproofing system comprising:
optionally a primer and/or an undercoat,
one or more than one layer of the membrane according to claim 1, and
optionally a top coat.

11. A method of waterproofing a roof structure, comprising:
applying the membrane according to claim 1 in liquid state onto a substrate of the roof structure in a layer thickness in the range of 0.5 to 3 mm;
contacting the membrane with a fibre reinforcement mesh within the open time of the membrane;
exposing the membrane to moisture to thereby cure the membrane partially or fully to obtain an elastic coating; and
optionally applying a second layer of the membrane in a layer thickness in the range of 0.5 to 3 mm and curing the second layer by exposure to moisture.

12. A waterproof roof structure, obtained by the method according to claim 11.

13. The membrane according to claim 1, wherein $R^5$ is a $C_1$ to $C_{12}$ linear or branched alkyl.

14. The membrane according to claim 1, wherein m is 3.

15. The membrane according to claim 1, wherein the ratio between the number of aldimino groups and the number of oxazolidino groups is in the range of 75/25 to 25/75.

16. The membrane according to claim 1, wherein the ratio between the number of aldimino groups and the number of oxazolidino groups is in the range of 70/30 to 30/70.

17. The membrane according to claim 1, wherein the ratio between the number of aldimino groups and the number of oxazolidino groups is in the range of 75/25 to 35/65.

18. The membrane according to claim 1, wherein the ratio between the number of aldimino groups and the number of oxazolidino groups is in the range of 60/40 to 40/60.

* * * * *